Sept. 18, 1962    T. H. BENZINGER    3,054,397
METHOD FOR MEASURING BODY TEMPERATURE Filed Nov. 5, 1959

THEODORE H. BENZINGER    INVENTOR.

BY *Louis L Shrogo*

United States Patent Office 3,054,397
Patented Sept. 18, 1962

3,054,397
METHOD FOR MEASURING BODY TEMPERATURE
Theodore H. Benzinger, Holly Oaks, Tilden Lane, Rockville, Md.
Filed Nov. 5, 1959, Ser. No. 851,202
2 Claims. (Cl. 128—2)
(Granted under Title 35, U.S. Code (1952), sec. 266)

The invention described herein may be manufactured and used by or for the Government of the United States of America for governmental purposes without the payment of any royalties thereon or therefor.

The present invention relates generally to methods for measuring body temperature for diagnostic and research purposes and, more particularly, to a method for obtaining a meaningful indication of the approximate operating temperature of the human "thermostat."

Conventional methods of measuring the body temperature of a human or animal in health or disease generally involve sensing the temperature in a body orifice. These measurements are usually of limited value in studying the temperature regulating mechanisms. They are made under the unproven assumption that "internal" body temperature is sufficiently uniform to permit their substitution for measurement at a site, where sensory reception of internal temperature actually takes place. Such sensory perception is required to activate sweating and peripheral blood circulation in defense against overheating of the body. It has been shown that rectal temperature, for one, may widely deviate from temperature measured near the hypothalamus in the forebrain. The hypothalamus, as is well known, has, among other ascribed functions, that of regulating the mechanism (vascular, glandular, etc.) by which, in animals of constant temperature, the body temperature is maintained steady despite environmental changes. Moreover, it has been recently determined that this region is a terminal sensory organ for temperature comparable to the eye for light and not a brain center for correlating messages relayed up from the receptor organs in the skin. Thus, this structure may be considered the human "thermostat."

It is accordingly a primary object of the present invention to provide a meaningful measurement of body temperatures on man or animals in health and disease.

A secondary object of the present invention is to provide an indication representing the operating temperature of the human "thermostat," that is, the anterior hypothalamus which functions to maintain the body temperature at a constant value in the presence of environmental temperature variations.

A still further object of the present invention is to provide a new method for determining body temperature.

Other objects and many of the attendant advantages of this invention will be readily appreciated as the same becomes better understood by reference to the following detailed description when considered in connection with the accompanying drawings wherein.

Briefly and in general terms, the above objects of invention are accomplished by utilizing as the clinical thermometer a thermocouple formed of extremely fine wire housed within an electrically insulated, flexible, tubular member. This thermocouple is introduced into the auditory canal and held in place against the typanic membrane. In order to avoid any possible injury to the membrane, the tubular member is fashioned into a loop at its extremity and its stiffness selected so that it is incapable of transmitting appreciable forces without bending or buckling. By monitoring the temperature of the tympanic membrane, which structure is the closest one can conveniently get to the anterior hypothalamus without surgery, meaningful information concerning the behavior of this region can be obtained.

Figure 1:
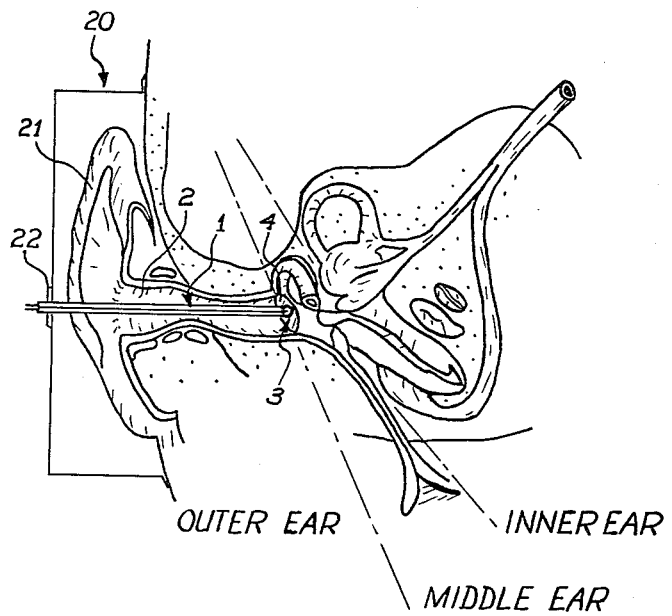
FIG. 1 is a semidiagrammatic section through the right ear illustrating the clinical ear thermometer of the present invention in its normal operating position.
Figure 2:
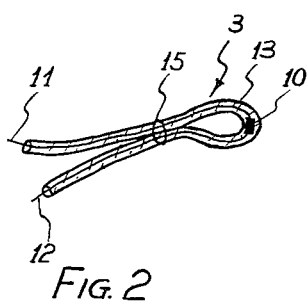
FIG. 2 shows the terminal portion of one type of thermal detector constructed according to the present invention.

Referring now to FIG. 1 which shows a semischematic section through the right ear, the clinical thermometer of the present invention, generally represented by reference character 1, is inserted into the ear canal 2 until its terminating loop 3 contacts the typanic membrane 4 closing this canal. As best shown in FIG. 2, the thermometer consists of a thermocouple junction 10 which is formed by soldering or otherwise joining end to end or side by side two wires 11 and 12 of dissimilar metal, such as, for example, Alumel and Chromel. These wires are housed within an electrically insulating tubing 13 which terminates in a loop portion 3 formed by tying together adjacent lengths thereof with a strand of thread 15. The purpose of forming this loop is two-fold: first, to prevent the dislocation of the thermocouple junction and, second, to guard against any damage to the tympanic membrane when the thermocouple is placed in contact therewith. It would be pointed out at this time that the flexibility of tubing 13 precludes the transmission of appreciable pressures to the ear drum. In one particular embodiment, the thermocouple was formed of 36-gauge wire and the tubing was of plastic composition having an outside diameter of approximately .025 inch.

In order to facilitate the introduction of the tubing into the auditory canal, an ear frame, generally represented schematically by reference character 20, can be attached to the head so as to provide a stable reference position with respect to the skull. After this frame is in position, the external part of the ear 21 can be pulled to straighten the auditory canal and permit the safe introduction of the instrument. In normal practice the tubing is inserted until the patient reports a slight pain or alteration of hearing. These reactions indicate that the thermocouple is in place and the tubing can then be secured to the ear frame by means of any suitable adhesive 22.

Figure 3:
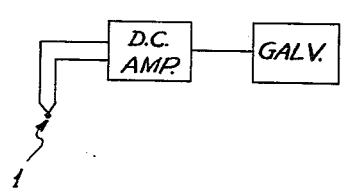
FIG. 3 illustrates a simple circuit for providing an indication of the temperature measured by the above thermometer.

For reading or otherwise recording the temperature of the typanic membrane, any conventional D.C. voltage measuring technique can be employed. For example, as shown in FIG. 3, the output signal may be simply amplified and fed to a galvanometer previously calibrated to read temperature. As an alternative, this signal can be balanced against a voltage derived from a reference thermocouple junction firmly secured to a small block of metal of high conductivity. As this block is warmed or cooled, it will pass through a temperature which is identical to that of the tympanic membrane and a null reading will be obtained in the voltage comparison circuit. The ear temperature then can be directly read from a mercury thermometer monitoring the temperature of the metallic block. To keep the apparatus always ready for service, this block may be kept at 37° C. by a temperature regulating circuit.

Rather than employ a thermocouple as the sensing member, the temperature reading at the tympanic membrane could be determined by means of a thermistor bead having soft lead wires. Because of its configuration, this bead would be as innocuous as the thermocouple loop, and its lead wires would provide the necessary resistance to the transmission of appreciable forces to the membrane. This thermistor, when calibrated and connected in a Wheatstone bridge made up of temperature independent resistors, would give a reading of absolute temperature and, therefore, with this arrangement there would be no requirement for a measured or controlled reference point.

In the above description, the temperature sensing element took the form of a thermocouple, but it will be recognized, of course, that other suitable detectors, such as resistance thermometers, thermistors or any device based on the expansion of solids, liquids or gases, may be substituted for the above thermoelectric method, provided, of course, that the sensing portion thereof is soft enough not to transmit damaging pressures to the sensitive tympanic membrane.

It would also be pointed out that the miniaturized amplifiers and potential sources could be employed to permit the ear temperature to be read directly from a calibrated pointer instrument. In other words, the required signal amplification and complementary balancing network could be built into the indicating instrument whereby a portable device would be available to the operator.

Obviously many modifications and variations of the present invention are possible in the light of the above teachings. It is therefore to be understood that within the scope of the appended claims the invention may be practiced otherwise than as specifically described.

What is claimed is:

1. In a method for measuring body temperature for diagnostic purposes, the steps of inserting a flexible thermoelectric probe into the auditory canal until the temperature-sensitive end portion thereof contacts the tympanic membrane and recording the level of the electrical output signal developed by said probe while maintaining said contact.

2. In a method for investigating body temperature for diagnostic purposes, the steps of inserting a thermoelectric probe into the auditory canal until contact is established between the temperature-sensitive end portion of said probe and a portion of the tympanic membrane, maintaining said contact and measuring the magnitude of the electrical output signal produced by said probe.

References Cited in the file of this patent
UNITED STATES PATENTS

| | | |
|---|---|---|
| 1,648,899 | Hayman | Nov. 15, 1927 |
| 2,111,677 | Robinson | Mar. 22, 1938 |
| 2,640,357 | Stephenson | June 2, 1953 |
| 2,816,997 | Conrad | Dec. 17, 1957 |